United States Patent
Staiger

[19]

[11] Patent Number: 6,125,963
[45] Date of Patent: Oct. 3, 2000

[54] REAR AXLE STEERING DEVICE

[75] Inventor: Freddy Staiger, Königsfeld-Erdmannsweiler, Germany

[73] Assignee: Horst Staiger & Sohne GmbH, Germany

[21] Appl. No.: 09/184,734

[22] Filed: Nov. 2, 1998

[30] Foreign Application Priority Data

Nov. 3, 1997 [DE] Germany ............... 197 48 474

[51] Int. Cl.[7] ............................................ B62D 7/06
[52] U.S. Cl. .................. 180/411; 180/408; 280/91.1
[58] Field of Search .................... 180/411, 408; 280/91.1

[56] References Cited

U.S. PATENT DOCUMENTS

| | | | |
|---|---|---|---|
| 389,568 | 9/1888 | Harden | 280/99 |
| 1,777,562 | 10/1930 | Hartwig | 380/81.1 |
| 2,066,721 | 1/1937 | Eaton | 74/242.9 |
| 2,228,247 | 1/1941 | Cunningham | 280/48 |
| 2,913,063 | 11/1959 | Brown | 180/42 |
| 4,335,626 | 6/1982 | Fisher | 74/496 |
| 4,566,391 | 1/1986 | Haberl et al. | 105/215.1 |
| 5,033,763 | 7/1991 | Daenens et al. | 280/426 |
| 5,752,710 | 5/1998 | Roberts | 280/91.1 |

FOREIGN PATENT DOCUMENTS

| | | |
|---|---|---|
| 0 794 104 A2 | 9/1997 | European Pat. Off. . |
| 18 03 363 | 12/1959 | Germany . |
| 24 34 363 | 2/1975 | Germany . |
| 40 25 543 A1 | 2/1992 | Germany . |

*Primary Examiner*—Brian L. Johnson
*Assistant Examiner*—Deanna Draper
*Attorney, Agent, or Firm*—Pendorf & Cutliff

[57] ABSTRACT

Rear wheel steering device with two spaced apart positioned steerable wheels (2A, 2B) wherein each of the wheels (2A, 2B) are coupled fixed against rotation with a rotatably mounted steering element (4A, 4B) exhibiting an at least segment-wise curved circumference area (40A, 42A, 40B, 42B) and wherein the two steering elements (4A, 4B) are positively coupled via a coupling element (5).

10 Claims, 6 Drawing Sheets

REAR AXLE STEERING DEVICE

BACKGROUND OF THE INVENTION

1. Field of the Invention

The present invention concerns a rear axle, or rear wheel, steering device with two spaced apart steerable wheels.

2. Description of the Related Art

A device of this type is known from DE 40 25 543 A1. Herein the wheels are respectively secured to a swiveling bolster which is mounted rotatably on an axle body. A steering of the wheels is accomplished by turning the swivel bolsters via respectively one hydraulic cylinder. In order to prevent an rubbing out or etching of the wheels during steering of a four wheeled vehicle, the steering of the two steerable wheels must be so coordinated with each other, that the extended line of their two wheel axes must cut or intersect upon an axis connecting the two front wheels or, as the case may be, an extension thereof. This makes necessary a complicated controlling of the two hydraulic cylinders which accomplish the steering.

SUMMARY OF THE INVENTION

The task of the present invention is thus, to provide a rear axle steering device, which can be achieved with simple means and never the less makes possible a precise steering of the rear axle steered vehicle without rubbing or etching of the wheels.

This objective is achieved by a rear axle steering device of the above described type, in which each of the two steerable wheels are non-rotationally connected to a rotatably mounted steering element with a curved circumference area, and in which the two steering elements are positively directly coupled via a coupling element.

The direct coupling of the steering elements brings about, that during—as is always the case—a steering of one wheel the other wheel is correspondingly steering along. The stronger turning-in of the steerable wheel on the inside of the turn, in comparison to the steerable wheel on the outside of the turn, results therefrom, that the circumference area of the outside curve steering element and the inside curve steering element, to which the coupling element is directed during turning of the steering element or, as the case may be, in which the coupling element newly engages, exhibit a differential curvature.

The inventive rear axle steering device thus requires essentially two steering elements coordinated or adjusted to each other with respect to their circumference contours, via which the rear axle steering device safely and reliably functions after its production without extensive or complicated controls.

It is advantageous when the coupling element which positively directly couples the two steering elements is a chain, a tooth belt or the like. This ensures a reliable, slip-free force transmission between the two steering elements. The steering elements possess structures which are adapted to the employed coupling element, in particular teeth, for engaging the coupling element.

Steering can, in the simplest case, be accomplished by turning one of the steering elements, for example by means of a shaft coupled thereon secured against rotation. Advantageously steering occurs by means of a control element, onto which a steering wheel or the like is coupled. The control element engages the coupling element spaced apart from the steering elements and translates rotational movements of the steering wheel into translation movements of the coupling element, whereupon the translation movement of the coupling element causes rotational movements of the two steering elements and therewith steering movement of the wheels. The control element is advantageously situated eccentrically to a rotation axis and brings about, besides a conversion of rotation movement of the steering wheel into translation movement of coupling element, at the same time a tensioning or tightening of the coupling element. The tensioning is necessary, since the steering elements are mounted rotatable about a fixed axis and their circumference area is differentially strongly curved, which upon the turning of the wheels without a stiffening or tensioning means would cause or bring about a more or less pronounced sagging or drooping of the coupling element. The construction of the control element for simultaneously causing steering movements and maintaining tension on the coupling element is in particular advantageous with respect to a reduction in the necessary construction components.

For direct conversion of rotation movement of the steering element into steering movements of the wheels without further gear units or transmission elements, it is foreseen that steering elements are so provided, that the wheel stand-up point of the two steerable wheels lie along the extended turn axis of the respective steering elements.

The steering elements are symmetric in the straight-ahead positioning of the wheels or, as the case may be, provided on an axis running parallel to the direction of travel. They exhibit, according to one embodiment of the invention, respectively two variously curved circumference areas, which steadily or continuously transition into each other. Advantageously one of the two curved circumference areas is formed as a circle segment, in particular a semi-circle.

The present invention makes possible an exact steering of the vehicle in which it is employed. The turn radius of the vehicle decreases with increasing turning-in of the steering wheel, the so called roll middle-point or pivot point, about which all four wheels move during turning-in of the steering, and travels along a line running through the axis of the two front wheels, depending upon the amount of turning-in of the steering. At maximal turning-in of the steering and minimal turn radius the pivot point is found in the middle between the two front wheels. In order to prevent excessive speeds at this type of small turning radius, and therewith an endangerment of the driver or as the case may be the environment, it is foreseen, that speed sensitive steering means are coupled to the control element of the rear axle steering device, whereby the maximal permitted speed decreases with increasing turning of the control element.

BRIEF DESCRIPTION OF THE DRAWINGS

The present invention is described in greater detail in the following on the basis of illustrative embodiments by means of the figures. There are shown

DETAILED DESCRIPTION OF THE INVENTION

In the figures, unless indicated otherwise, the same reference numbers indicate the same parts with the same meaning.

Figure 1:
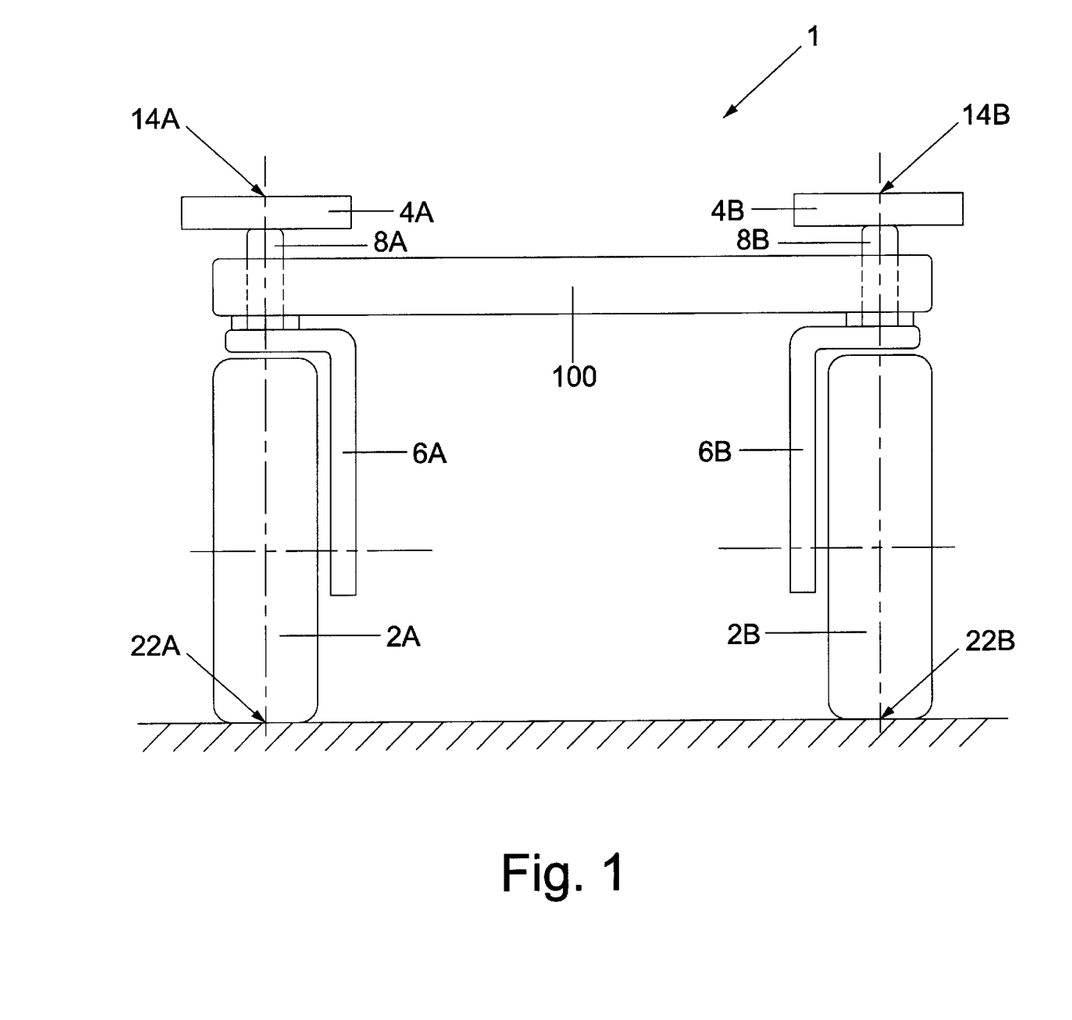
FIG. 1: a first embodiment of an inventive rear-axle steering device in front view.
Figure 2:
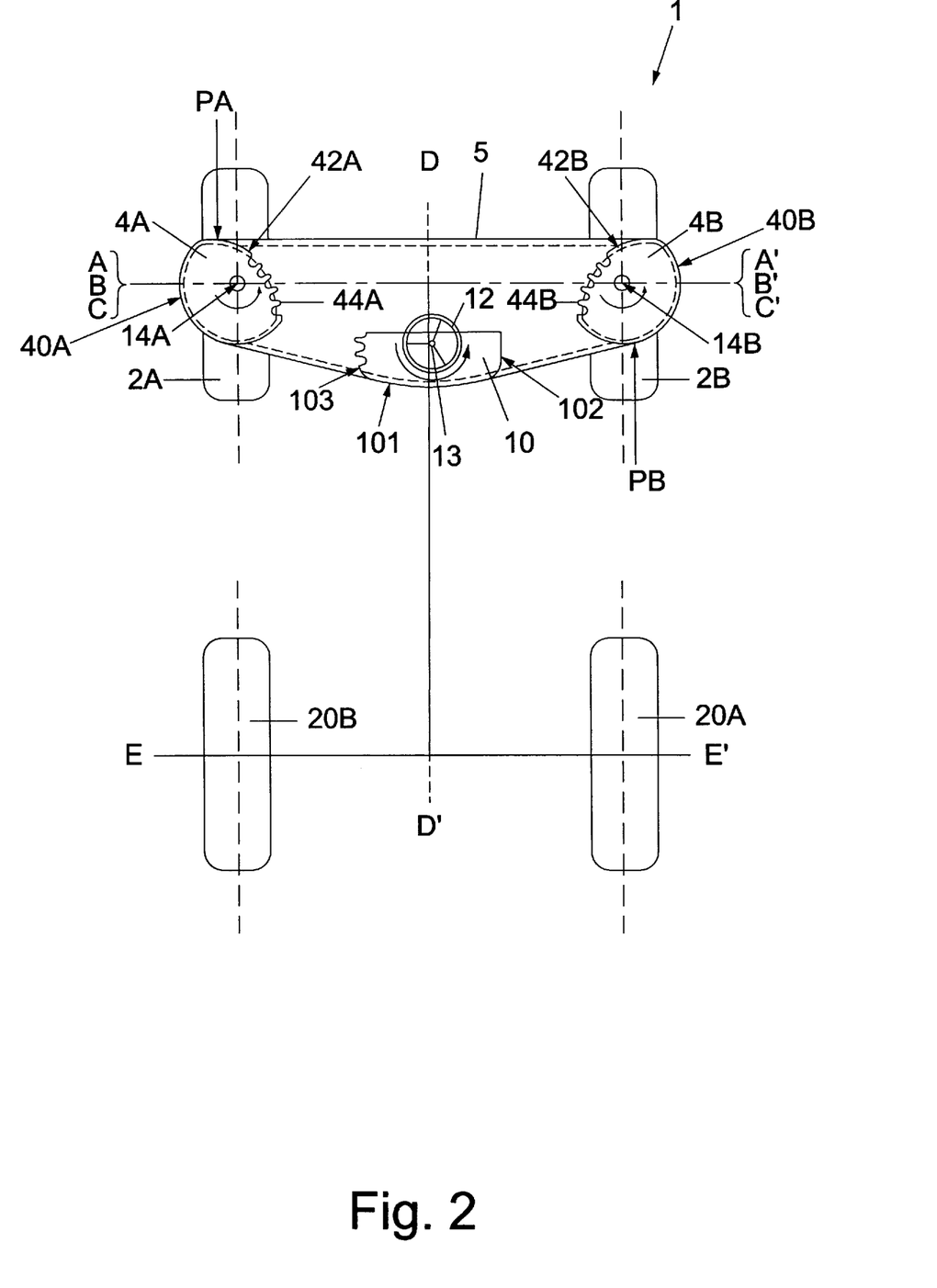
FIGS. 2 through 5: inventive rear-axle steering device in top view in various steering positions.
Figure 3:
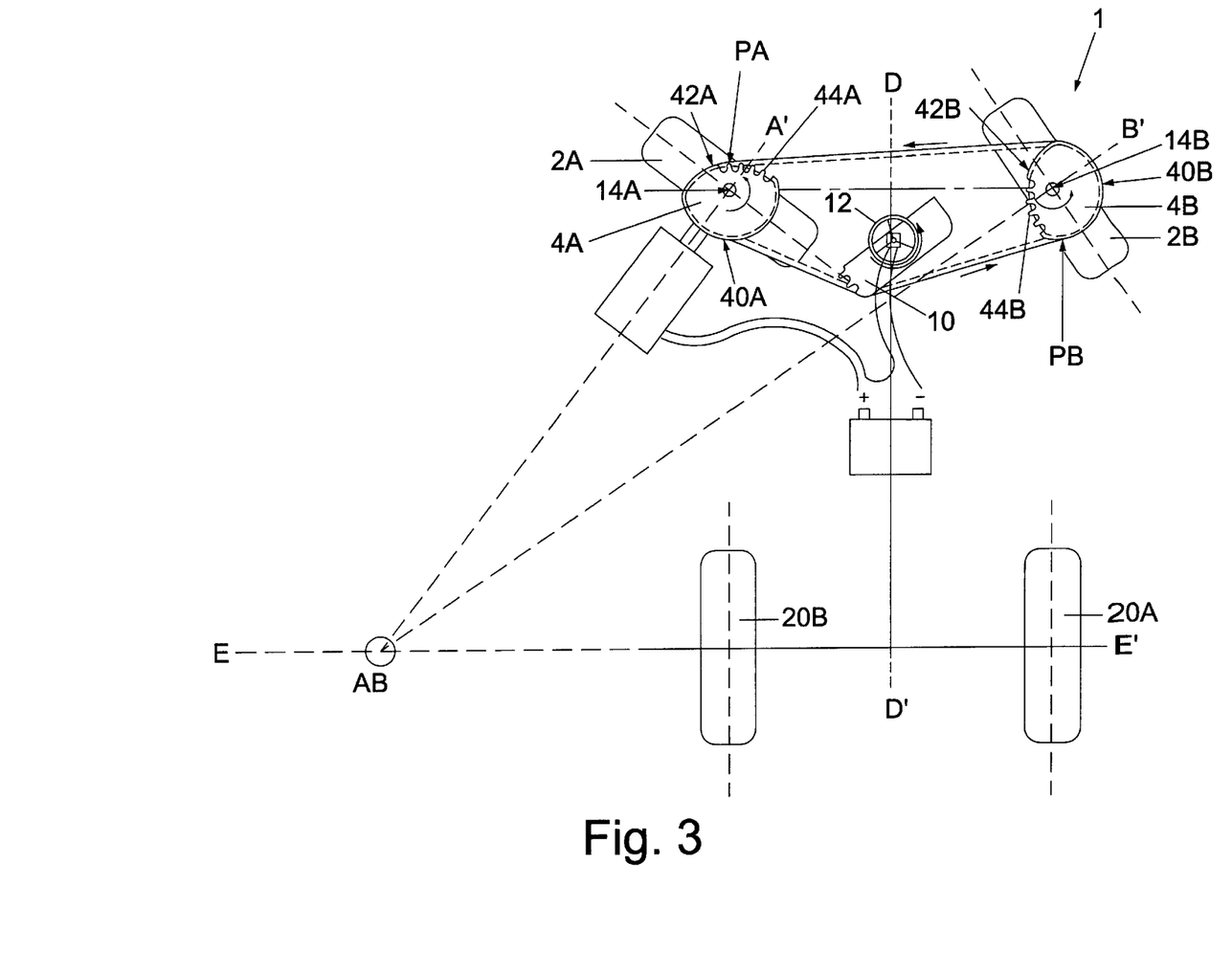
Figure 4:
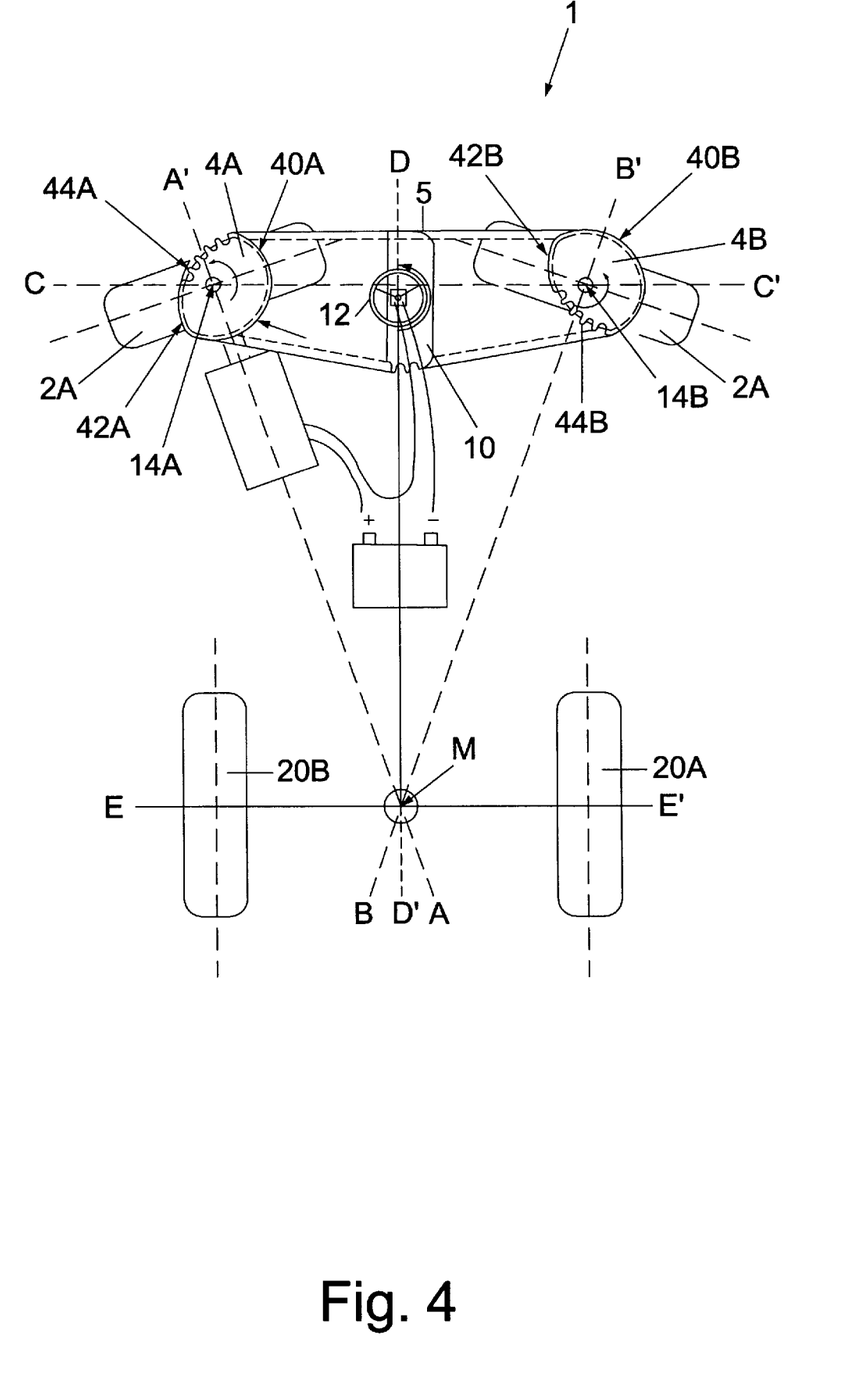
Figure 5:
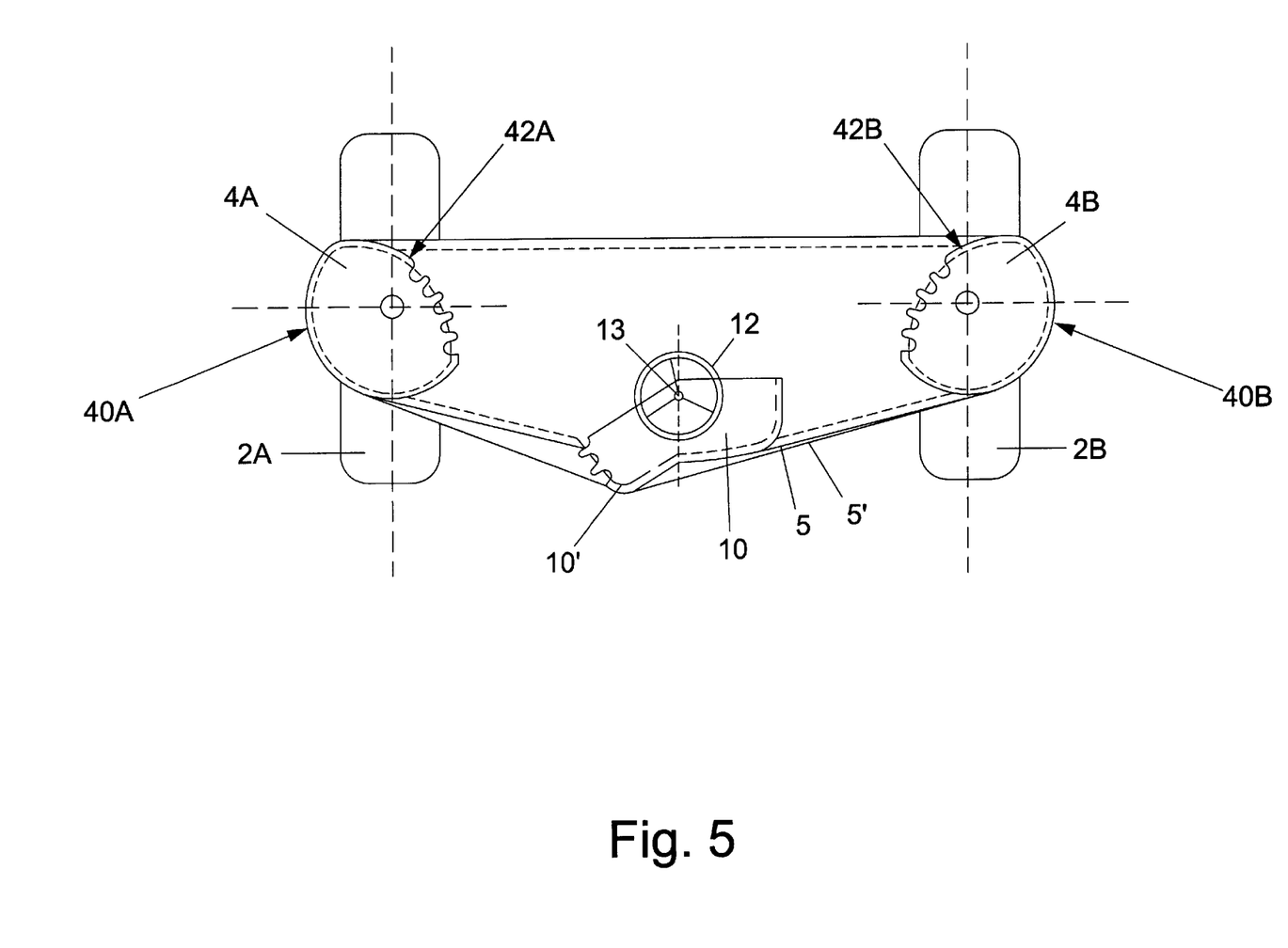

An inventive rear axle steering device shown in FIG. 1 in front view is comprised of two steerable wheels 2A, 2B spaced apart from each other. Respectively one steering element 4A; 4B is coupled with one wheel 2A; 2B fixed against rotation, wherein the coupling is achieved by means of two shafts 8A, 8B which extend through an axis body, which are nonrotationally connected to wheels 2A, 2B bearing forks 6A, 6B. The steering elements 4A, 4B are essentially disk shaped, wherein they are positively coupled with a coupling element which engages one of their circumference edges, not shown in FIG. 1. Wheel contact points 22A, 22B of the wheels 2A, 2B are located in the illustrated embodiment of the rear axle steering device in the extension of the rotational axis 14A, 14B of the steering elements 4A, 4B.

The inventive rear axle steering device 1 is shown in FIGS. 2 through 5 in top view for various steering positions of the two steerable wheels 2A, 2B. For reasons of presenting a simplified overview the wheels 2A, 2B, the steering elements 4A, 4B, the coupling element 5 and a control element 10 are in essence represented. With regard to the representation of the axle body shown in FIG. 1 as well as other securing and mounting means, these are omitted. For ease of illustrating the steering process, in FIGS. 2 through 4 further two front wheels 20A, 20B are represented, which are fixedly associated with a not shown axle which extends in the direction of line EE'. The necessary longitudinal girders or runners of the carriage body for connection of one of the front axle bodies carrying the front wheels 20A, 20B and the rear axle body are likewise not shown. The distance between the rotation axis 14A, 14B of the steering elements 4A, 4B and the front wheels 20A, 20B is constant.

The two steering elements 4A, 4B respectively exhibit two differently curved circumference areas 40A, 42A, 40B, 42B. The steering elements 4A, 4B are positively coupled in the shown examples by means of a loop or closed curve shaped coupling element 5, wherein the coupling element 5 engages in the circumference areas 40A, 42A, 40B, 42B of the steering elements 4A, 4B. The rotational movement of one of the two steering elements 4A; 4B necessarily causes, as a result of the positive coupling, also a rotational movement of the other steering element 4B; 4A. The shown coupling element 5 comprises a chain or toothed belt, which engages in teeth 44A, 44B of the steering elements 4A, 4B and therewith achieves a reliable and secure coupling of the steering elements 4A, 4B.

The two variously curved outer circumferences 40A, 42A, 40B, 42B of respectively each one of the steering elements 4A; 4B continuously transitions into each other.

A control element 10 rotatably mounted about an axis 13 engages the coupling element 5 between the two steering elements 4A, 4B. Rotational movements of the control element 10 are converted into translational movement of the coupling element 5, which again causes rotational movements of the steering elements 4A, 4B and therewith steering movements of the wheels 2A, 2B which are coupled fixed against rotation with the steering elements 4A, 4B. For inputting of this type of steering movement the control element 10 is connected for example with a steering wheel 12, which, in the simplest case, is provided on a shaft along the elongation of the rotation axis 13 of the control element 10.

In order to prevent, during a turning of the vehicle, a rubbing out or etching of the wheels 2A, 2B, 20A, 20B, then the elongation or extensions of the wheel axis AA', BB' of the two steerable wheels 2A, 2B and the elongations of the wheel axis EE' of the two fixed front wheels 20A, 20B for each degree of steering intersect at a point M, the so called pivot point or roll middle point.

The stronger turning-in of the inside wheel 2A of the turn with respect to the outside wheel 2B of the turn which is necessary for this is achieved thereby, that the curvature of the circumference areas 40B, 42A in which the coupling element 5 newly engages on the steering element 4A, 4B, possess varying curvatures. So during a counterclockwise turning of the control element 10, and a therewith associated movement of the coupling element 5 in the direction indicated by the arrow, the coupling element 5 newly engages only in segments of the same circumference area 40B of the steering element 4B of the curve outer wheel 2B and only in segments of the same circumference area 42A of the steering element 4A of the curve inner wheel 2A. The relationship of the angular movement of the curve outer wheel 2B and the curve inner wheel 2A, which is brought about by a translational movement of the coupling element 5, is a product of the relationship of the respective spacing between the rotation axes 14A, 14B and the circumference area points PA and PB, in which the coupling element 5 part is newly engaging the steering element 4A, 4B.

The two steering elements 4A, 4B are in the straight ahead position (FIG. 2) arranged symmetric with respect to a vehicle axis DD' extending in the direction of driving. In the straight ahead positioning the coupling element 5 radialy engages in both circumference areas 40A, 42A, 40B, 42A of the two steering elements 4A, 4B. The steering elements 4A, 4B are so calibrated or adjusted with respect to each other, that in the maximal turn position (FIG. 4), when the wheel axes AA', BB' of the two steerable wheels 2A, 2B intersect in the middle between the two front wheels 20A, 20B, the coupling element 5 just barely exclusively newly engages in the circumference area responsible for the respective turning movement.

In the steering elements 4A, 4B in the illustrative embodiment the circumference area 40A; 40B responsible for the rotation movement of the respective curve outer wheel 2A; 2B is shown as a semi-circle. The respective other circumference area 42A; 42B is elliptically shaped, wherein the circumference areas 40A, 42A, 40B, 42B of a steering element 4A, 4B respectively steadily transition into each other.

Figure 6:
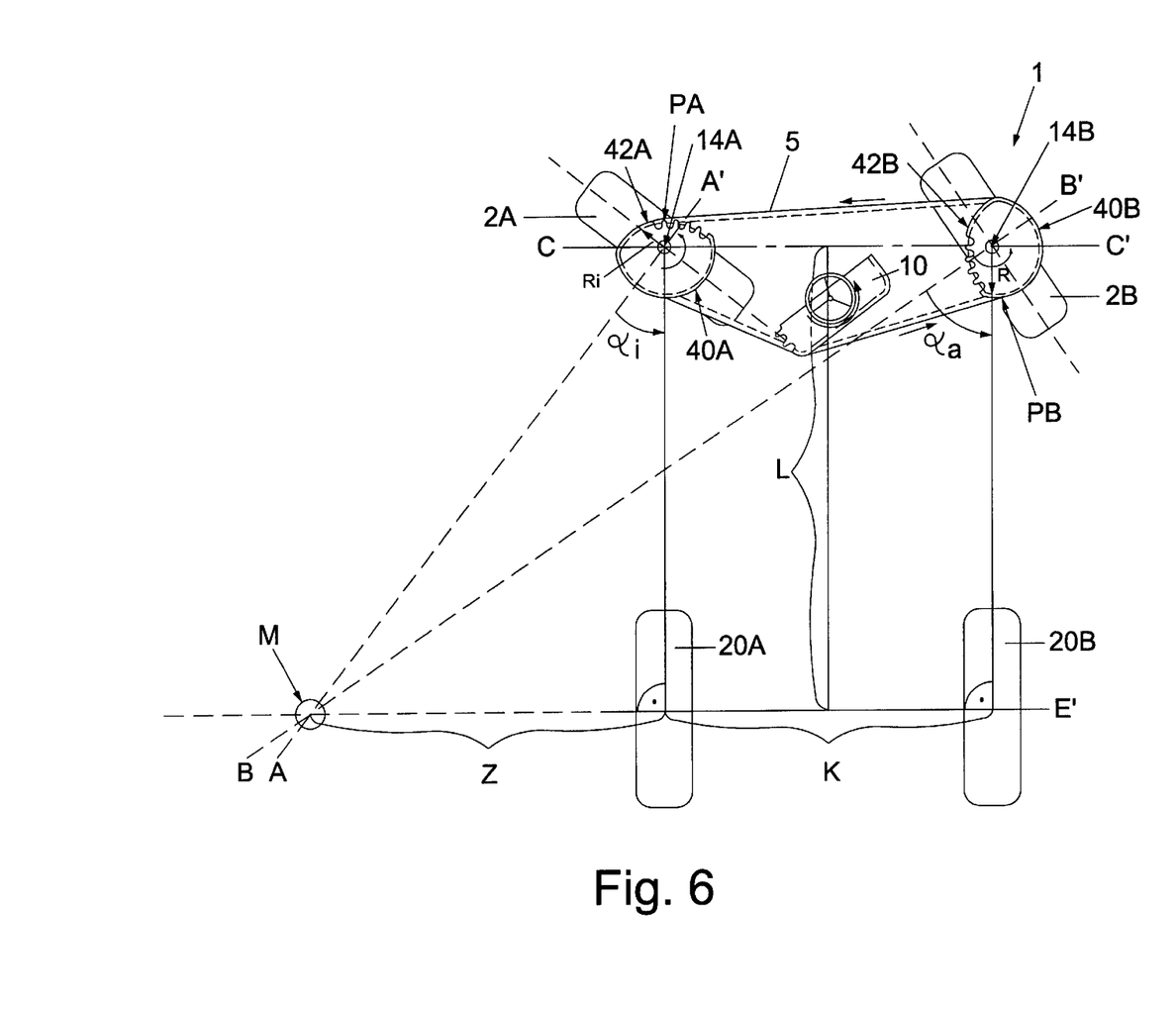
FIG. 6: illustration of the vehicle geometry as basis for the determination of the circumference area of the steering elements.

Besides converting the rotation movement of the steering wheel 12 into a translation movement of the coupling element 5, the control element 10 serves to maintain tightness in the coupling element 5 for various turn positions of the wheels 2A, 2B or as the case may be steering elements 4A, 4B. The control element 10 shown in the figures is essentially shaped right angled with rounded off edges, wherein it has teeth on three sides 101, 102, 103 for engagement in the coupling element 5. The manner of function for the control element 10 for tightening the coupling element 5 can be seen in FIG. 5. The control element is shown here for two steering positions, in the right part in the straight-ahead position, in the left part in the turned-in position. Control element and coupling element are shown in FIG. 6 in turned-in position by reference drawings with elevated lines. The length of the section of the coupling element 5, 5' which extends between the steering elements 4A, 4B via the coupling element 10, 10' is increased in the turned-in position of the control element 10' in comparison to the straight ahead position of the control element 10. This length equalization is necessary, in order to prevent a sagging of the coupling element 5 with increasing engagement of the coupling element 5 in the weaker curved circumference area 42A of the steering element 4A of the curved inner wheel 2A.

Relationships between circumference areas 40A, 42A, 40B, 42B of the steering elements 4A, 4B shall be described in the following with reference to FIG. 6.

In order to achieve a steering of the vehicle without rubbing out or etching the wheels 2A, 2B, 20A, 20B, a projection or lengthening of the wheel axes AA', BB' of the two steerable wheels 2A, 2B and the extension of the axis EE' extending through the two front wheels 20A, 20B must for all steering positions intersect in a pivot point M. In the example shown in FIG. 6 a turning of the control element 10 and therewith the steering element 4A, 4B occurs in the counter-clockwise direction. The vehicle describes a right curve about the pivot point M. The coupling element 5 moves during this steering movement upon the stronger curved circumference area 40B of the turn outer wheel 2B and towards the weaker curved circumference area 42A of the turn inner wheel 2A. It is ensured, that during or with steering movements of the steering elements 4A, 4B counter to the clockwise direction (right turn) the coupling element 5 newly engages only in the circumference areas 42A, 40B. Correspondingly, it is valid that for the circumference area 42B and 40A during steering movement of the steering elements 4A, 4B in the clockwise direction. The steering relationship of the two wheels 2A, 2B in a steering direction is thus exclusively determined by one of the two circumference areas 40A; 42A, 40B; 42B of the steering elements 4A, 4B.

The wheel axes BB' of the curve outer wheel 2B together with a line extending perpendicularly from the front axes EE' forms an angle $\alpha_a$. The wheel axes AA' of the curve inner wheel 2A together with a line extending perpendicularly from the front axes EE' forms an angle $\alpha_i$. An axes CC' connecting the turn points 14A, 14B of the steering elements 4A, 4B extends parallel to the front axes EE', wherein these axes have a separation L. The separation of the two turn points 14A, 14B is represented by K. The perpendicular separation of the pivot point M from the line which is perpendicular to the wheel front axes EE' and which extends through turn point 14A of the curve inner wheel 2A corresponds to z.

Beginning with the mentioned measurements there results for the two angles $\alpha_a$ and $\alpha_i$ from FIG. 6 the following equation:

$$\tan \alpha_a = \tan \alpha_i + K/L => \tan \alpha_i = \tan \alpha_a - K/L \quad (1)$$

For infinitesimal changes $d\alpha_a$ of the angle $\alpha_a$ and for infinitesimal changes $d\alpha_i$ of the angle $\alpha_i$ the following equations apply:

$$d\alpha_a = dx/R \quad (2)$$

$$d\alpha_i = dx/R_i \quad (3)$$

wherein R determines the separation between the turning point 14B of the outer wheel steering element 4B to the point PB of the circumference area 40B, at which the coupling element 5 just newly engages. $R_i$ determines the point PA of the circumference area 42A of the curve inner steering element 4A, at which the coupling element 5 just newly engages. dx represents an infinitesimal translational movement of the coupling element 5. By solving the equation according to $\alpha_i$ and deriving the resulting formula according to $\alpha_a$ the following equation results:

$$\frac{d\alpha_i}{d\alpha_a} = \frac{1}{(\tan\alpha_a - K/L)^2 + 1} \cdot \frac{4}{\cos^2\alpha_a} \quad (4)$$

Employing the equations (2) and (3) in Equation (4) the following relationship between R and $R_i$ is produced:

$$R_i = R \cdot \cos^2 \alpha_a \cdot [(\tan \alpha_a - K/L)^2 + 1] \quad (5)$$

From this one can calculate for any angle $\alpha_a$ for the curve outer wheel 2B the separation $R_i$ between the circumference area 42A and the turn center point 14A of the curve inner steering element 4A in dependence upon respective separation of the circumference area 40B of the curve outer steering element 4B to the turn middle point 14B. The separation R between the turn point 14B and the circumference are 40B of the curve outer steering element 4B is dependent selectively upon $\alpha_a$, advantageously this separation is however constant for a total circumference area 40B, from which the circumference area 40B of the curve outer steering element 4B as shown as circular line is produced. The contour of the herein not in greater detail shown circumference area 40A of the curve inner steering element and the circumference area 42B of the curve outer steering element 4B is produced out of the already discussed symmetrical relationship, according to which the two steering elements 4A, 4B in the straight ahead position area symmetrical with respect to an axis running between them.

The stronger curved circumference areas 40A, 40B are semi-circular in design in the represented embodiment, wherein the contour of the respective other circumference areas 42A, 42B results from Equation (5).

| | Reference Number List |
|---|---|
| 2A, 2B | Wheels |
| 4A, 4B | Steering element |
| 5, 5' | Coupling element |
| 6A, 5B | Fork |
| 8A, 8B | Shaft |
| 10, 10' | Control element |
| 12 | Steering wheel |
| 13 | Turn axis of the steering wheel |
| 14A, 14B | Rotation axis of the steering elements |
| 20A, 20B | Front wheels |
| 22A, 22B | Wheel contact points |
| 40A, 40B, 42A, 42B | Circumference area of the steering elements |
| 44A, 44B | Teeth |
| 100 | Axle body |
| 101, 102, 103 | Sides of the control element |
| AA', BB', EE' | Wheel axes |
| CC' | Connection axis between turn points of the steering elements |
| R, $R_i$ | Radius |
| M | Pivot point |

What is claimed is:

1. Rear axle steering device comprising:
   two spaced apart steerable wheels (2A, 2B),
   two rotatably mounted steering elements (4A, 4B), one of each fixedly coupled to each of said wheels (2A, 2B), said steering elements (4A, 4B) at least section-wise exhibiting two respectively different curved circumference areas (40A, 40B, 42A, 42B) wherein the circumference areas (40A, 42A; 40B, 42B) of one steering element (4A; 4B) steadily transition into each other,
   a coupling element (5) positively coupling the two steering elements (4A, 4B), wherein the coupling element (5) during turning from neutral to left newly engages only in said first segment (40A) of said first steering element and said second segment (42B) of said second steering element, and during a turning from neutral to right newly engages only in said second segment (42A) of said first steering element and said first segment (40B) of said second steering element, a steering wheel (12), and a control element (10) connected to said steering wheel (10), which control element is engaged in the coupling element (5) for conversion of rotation movement of said steering wheel (12) into translation movement of the coupling element (5).

2. Device according to claim 1, wherein the coupling element (5) is a chain, a toothed belt, or the like, and wherein the circumference area (40A, 40B, 42A, 42B) of the steering elements (4A, 4B) exhibits structures (44A, 44B) adapted for engagement with the coupling element (5).

3. Device according to claim 2, wherein said structures exhibited by said steering elements (4A, 4B) adapted for engagement with the coupling element (5) are teeth.

4. Device according to claim 1, wherein the control element (10) is dimensioned to take up slack and engage the coupling element (5) with constant tension.

5. Device according to claim 1, wherein wheel contact points (22A, 22B) of the wheels (2A, 2B) lie on the rotation axis (14A, 14B) of the respective steering elements (4A, 4B).

6. Device according to claim 1, wherein said steering elements (4A, 4B) when in the straight forward position of the wheels (2A, 2B) are arranged symmetric with respect to a center axis (DD') running parallel to the direction of driving.

7. Device according to claim 1, wherein the circumference areas (40A, 40B, 42A, 42B) are ellipse segments.

8. Device according to claim 1, wherein respectively one of the circumference areas (40A, 40B) of each of the steering elements (40A, 40B) is shaped as a semi-circle.

9. Rear axle steering device comprising:

two spaced apart steerable wheels (2A, 2B), two rotatable mounted steering elements (4A, 4B), one of said steering elements fixedly coupled to each of said wheels (2A, 2B), each steering element exhibiting at least one first circumference segment with a first curvature (40A, 40B) and at least one second circumference segment with a second curvature (42A, 42B) different from the first curvature, wherein said first circumference segment steadily transition into said second circumference segment in each steering element, a coupling element (5) positively coupling the two steering elements (4A, 4B), wherein the coupling element (5) during turning from neutral to left newly engages only in said first segment (40A) of said first steering element and said second segment (42B) of said second steering element, and during a turning from neutral to right newly engages only in said second segment (42A) of said first steering element and said first segment (40B) of said second steering element, a steering wheel (12), and a control element (10) connected to said steering wheel (10), which control element is essentially quadrilateral, and which control element is engaged in the coupling element (5) for conversion of rotation movement of said steering wheel (12) into translation movement of the coupling element (5).

10. Rear axle steering device comprising:

two spaced apart steerable wheels (2A, 2B), two rotatably mounted steering elements (4A, 4B), one of said steering elements fixedly coupled to each of said wheels (2A, 2B), each steering element exhibiting at least one first circumference segment with a first curvature (40A, 40B) and at least one second circumference segment with a second curvature (42A, 42B) different from the first curvature, wherein said first circumference segment steadily transition into said second circumference segment in each steering element, a coupling element (5) positively coupling the two steering elements (4A, 4B), wherein the coupling element (5) during turning from neutral to left newly engages only in said first segment (40A) of said first steering element and said second segment (42B) of said second steering element, and during a turning from neutral to right newly engages only in said second segment (42A) of said first steering element and said first segment (40B) of said second steering element, a steering wheel (12), and a control element (10) connected to said steering wheel (10), and which control element is engaged in the coupling element (5) for conversion of rotation movement of said steering wheel (12) into translation movement of the coupling element (5), wherein means are provided for detecting the degree of turn-in of the control element (10) and for lowering the maximal allowed speed with increased turning-in of the control element (10).

* * * * *